April 12, 1960
A. N. T. ST. JOHN ET AL
2,932,597
METHOD OF FABRICATING A POLYESTER
POLYTETRAFLUOROETHYLENE
RESIN LAMINATED PIPE
Filed Jan. 11, 1957
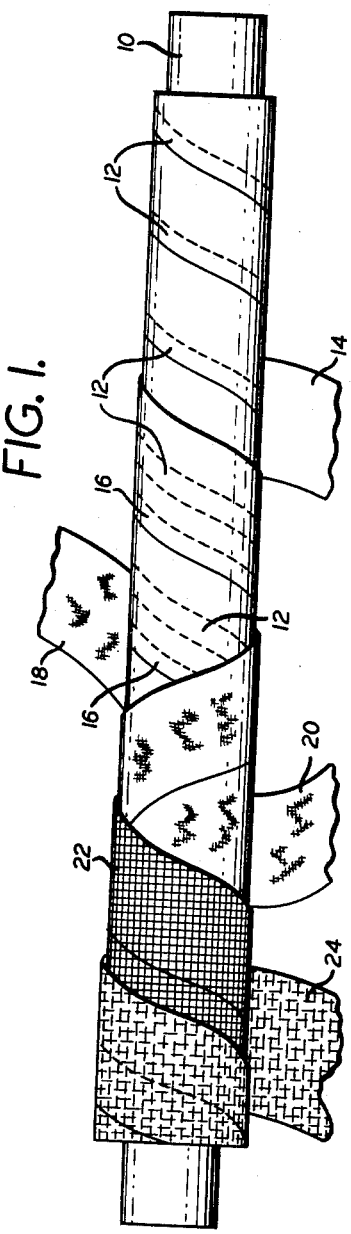
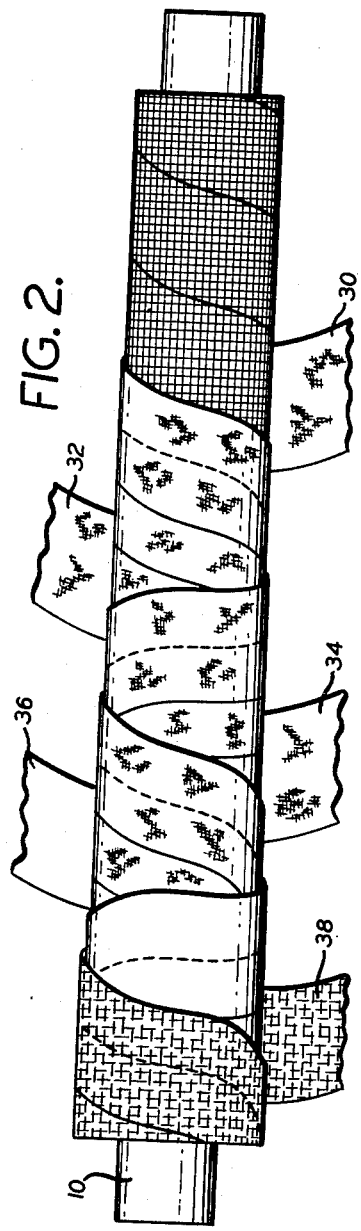
INVENTORS
ALEXANDER N. T. ST. JOHN
BENJAMIN M. WALKER
BY
*Churchill, Weymouth & Engel*
ATTORNEYS.

United States Patent Office 2,932,597
Patented Apr. 12, 1960

2,932,597

METHOD OF FABRICATING A POLYESTER POLYTETRAFLUOROETHYLENE RESIN LAMINATED PIPE

Alexander N. T. St. John, Glen Ridge, and Benjamin M. Walker, Caldwell, N.J., assignors to Resistoflex Corporation, Roseland, N.J., a corporation of New York Application January 11, 1957, Serial No. 633,728

12 Claims. (Cl. 154—83)

The present invention relates to a chemically inert tube or pipe and to a process for its manufacture.

In the specification that follows the terms "pipe" and "tube" are used interchangeably to designate any hollow body or conduit regardless of cross-section capable of conveying a liquid or fluid medium. By the term "chemically inert" it is intended to mean that the pipe is immune to attack by all chemicals and solvents except molten alkali metals, and fluorine at elevated temperatures and pressures.

Pipes or tubes having such chemical immunity are in great demand by the chemical and pharmaceutical industries as well as by the food processing industries and many others. Of course, there are pipes available having much the same general type of immunity such as those made of glass, porcelain, ceramic stoneware, and combinations of these with steel, and so forth. But all of these are quite fragile and subject to chipping or breaking, requiring frequent repair and replacement.

In the copending application of Alexander N. T. St. John and Benjamin M. Walker for "Reinforced Polytetrafluoroethylene Pipe and Method of Making It," Serial No. 481,814, filed January 14, 1955, now Patent No. 2,888,042, issued May 26, 1959, there is disclosed and claimed a chemically inert pipe having a lining of polytetrafluoroethylene resin (hereinafter abbreviated P.T.F.E.) reinforced by a plurality of layers of glass fabric pre-impregnated with the resin, wherein the lining is fused in situ from unfused paste-extruded P.T.F.E. and simultaneously bonded to the reinforcing layers. As pointed out in that specification, the pipe thus produced had a non-porous inner wall surface even after extended periods of use, and, thus, full advantage could be taken of the chemically inert properties of the P.T.F.E. resin.

Although pipe produced in accordance with the aforesaid application is fully capable of accomplishing its stated purpose, it is, nevertheless, quite costly to produce at present due to the high cost of P.T.F.E.

It is, therefore, an object of the present invention to provide a more economical pipe having essentially the same chemically inert properties and the same or better mechanical properties.

In accordance with the present invention a method is provided for furnishing a thermosetting resin-fabric tube with an integral lining of non-porous P.T.F.E. resin.

The invention will be better understood after reading the following detailed description thereof with reference to the appended drawings in which:

Fig. 1 is a diagrammatic representation illustrative of the various steps involved in the preparation of a first or sub-assembly for a typical embodiment in accordance with the invention, and Fig. 2 is a view similar to Fig. 1 illustrative of the subsequent steps which may be employed in practicing the method according to the invention.

A typical embodiment of the invention will now be described in detail with reference to the drawings. Starting with a mandrel, designated 10 in the drawings, the first step is to place thereon a continuous layer of paste-extruded P.T.F.E. free of volatile constituents. The presently preferred method is to use unfused paste-extruded tape which is wrapped upon the mandrel with a slight overlap, such as shown at 12. For best results it has been found desirable to follow this wrap with a second wrap 14 of fused P.T.F.E. tape. As shown in Fig. 1 the second wrap is advantageously placed upon the first wrap in the same direction but with the areas of overlap 16 located intermediate the areas of overlap 12. It can be appreciated that this will provide a more uniform surface than if the second wrap were laid on in the reverse direction.

The next step is to add one or more wraps of a fabric tape which has been impregnated with fused or sintered P.T.F.E. For illustrative purposes, two such wraps 18 and 20 are shown in Fig. 1. It is important to note, however, that the final wrap, herein the wrap 20, is only impregnated on its inner surface, while its outer surface 22 has the fabric exposed. The underwraps such as 18 must be impregnated on both surfaces. It has been found that exceedingly good results will be obtained if the fabric is made of glass. It will be found, however, that the P.T.F.E. impregnated fabric is comparatively inflexible. Therefore, in order to produce a final assembly which is free of voids, it will usually be necessary to avoid overlapping the turns as the tape is laid on. However, care should be taken to achieve a reasonably tight butt joint between adjacent turns. Using the butt joint, it is now better practice to alternate the direction of winding of each successive wrap.

After the wrapping of the single sided impregnated tape 20, there is placed upon the unit a pressure applying wrap 24 of an uncoated glass fabric tape. The wrapping 24 is preferably laid on top of the tape 20 in the same direction so as to aid in tightening the underwrap. The assembly thus formed should be heated in any suitable manner until it attains a uniform temperature in excess of the gel point of P.T.F.E. Although the gel point is in the neighborhood of 620° F. it is presently preferred to raise the temperature to about 700° F. until the unfused tape fuses and the adjacent resin surfaces bond or fuse together.

As described and claimed in the copending application of Benjamin M. Walker and Alexander N. T. St. John Serial No. 440,802, filed July 1, 1954, now Patent No. 2,783,173, issued February 26, 1957, the glass fabric tape wrap 24 functions to apply pressure to the underlying wraps as heat is applied to the assembly. After the source of heat is removed and the assembly has an opportunity to cool, the tape 24 is removed. This will provide a complete sub-assembly conforming to the shape of the mandrel and having an outer surface of bare glass fabric. The subsequent operation is illustrated in Fig. 2 wherein a plurality of wraps of fabric tape 32 and 34 saturated on both surfaces with an uncured thermosetting resin is placed upon the sub-assembly to form a composite assembly. For the purpose of illustration only three wraps have been shown in Fig. 2 although fewer, but preferably more, can be employed. As illustrated, each wrap is laid on in the opposite direction. Because of the usual flexibility of uncured thermosetting resins it is possible to overlap adjacent turns with a half lap being preferred. The thermosetting resin may be of any kind so long as it will adhere to the material forming the outer surface 22 of the sub-assembly. The resins presently believed to be most suitable are commonly called epoxys.

Having placed the wrappings 32 and 34 upon the sub-assembly it is now necessary to cure or set the thermosetting resin. This may be accomplished through the application of heat or by means of a catalyst or in any other known manner. If it should be found necessary to apply pressure to the outermost wrap of the thermosetting resin impregnated fabric, there may be placed upon the composite assembly first a wrapping of fused P.T.F.E. tape 36 followed by a wrapping of glass fabric tape 38. The fused tape 36 will act as a separating medium to enable removal of both it and the pressure applying wrap 38 after the thermosetting resin is cured. Following the curing of the resin, the composite assembly is removed from the mandrel and the pipe is thus complete.

It will be appreciated that the finished pipe consists of a lining of solid P.T.F.E. resin, which may or may not contain reinforcing layers of fabric, bonded to a tube of thermosetting resin which is reinforced with layers of fabric.

As previously mentioned, the wrapping 18 may be omitted so long as the wrapping 20 is retained. It has been found that the epoxy resins have such strong adhesive propensities with respect to the exposed glass fabric that some slight extrusion of the solid P.T.F.E. resin through the joints of the wrapping 20 will not interfere with the formation of a satisfactory end product.

It should be understood that during the preparation of the sub-assembly, heat should be applied thereto above the fusion temperature but below the decomposition temperature of the P.T.F.E.

Having described the invention in terms of a specific embodiment thereof, it is to be understood that specific details may be varied by those skilled in the art without departing from the over-all spirit of the invention.

We claim:

1. The method of making a thermosetting resin-fabric tube with an integral lining of polytetrafluoroethylene resin comprising the steps of placing on a mandrel a continuous layer of paste-extruded polytetrafluoroethylene resin free of volatile constituents, thereafter applying one or more wraps of fabric with the final wrap impregnated on its inner surface only and all previous wraps impregnated on both surfaces with polytetrafluoroethylene resin, applying heat and pressure to the wrapped layer raising the temperature thereof to above the fusion temperature but below the decomposition temperature of the resin to fuse together adjacent resin surfaces, cooling and releasing the pressure on said wrapped layer to provide a sub-assembly, thereafter placing upon said sub-assembly a plurality of wraps of fabric saturated on both surfaces with an uncured thermosetting resin to form a composite assembly, curing said thermosetting resin and thereafter removing said composite assembly from the mandrel, whereby a unitary tubular structure is formed having essentially the mechanical properties of the thermosetting resin-fabric combination and the chemically inert properties of the polytetrafluoroethylene resin.

2. The method according to claim 1, wherein the paste-extruded polytetrafluoroethylene resin placed upon the mandrel to form said continuous layer is a wrap of unfused tape which is sintered and fused upon said application of heat thereto.

3. The method according to claim 1, wherein said continuous layer of paste-extruded polytetrafluoroethylene resin comprises a first wrap of unfused tape, and wherein a second wrap of fused tape is disposed between said first wrap of unfused tape and the first wrap of fabric impregnated with said polytetrafluoroethylene resin.

4. The method according to claim 3, wherein said wraps of unfused and fused tape are each wrapped in the same direction with each successive turn slightly overlapping the previous turn and with the overlapping areas of said wraps displaced from each other along the length of the tube, whereby a comparatively even surface is presented to said wraps of fabric impregnated with polytetrafluoroethylene.

5. The method according to claim 4, wherein said wraps of fabric impregnated with polytetrafluoroethylene are laid on with a butt joint between adjacent turns, whereby a uniform cross-sectional shape is achieved.

6. The method according to claim 1, wherein said wraps of fabric impregnated with polytetrafluoroethylene are laid on with a butt joint between adjacent turns, whereby a uniform cross-sectional shape is achieved.

7. The method of making a thermosetting resin-fabric tube with an integral lining of polytetrafluoroethylene resin comprising the steps of placing on a mandrel a continuous layer of paste-extruded polytetrafluoroethylene resin free of volatile constituents, thereafter applying one or more wraps of fabric with the final wrap impregnated on its inner surface only and all previous wraps impregnated on both surfaces with polytetrafluoroethylene resin, tightly placing thereon a wrapping of glass fabric tape, heating the wrapped layer to above the fusion temperature but below the decomposition temperature of the resin to fuse together adjacent resin surfaces, cooling the wrapped layer and removing the glass tape to provide a sub-assembly, thereafter placing upon said sub-assembly a plurality of wraps of fabric saturated on both surfaces with an uncured thermosetting resin to form a composite assembly, curing said thermosetting resin, and thereafter removing said composite assembly from the mandrel, whereby a unitary tubular structure is formed having essentially the mechanical properties of the thermosetting resin-fabric combination and the chemically inert properties of the polytetrafluoroethylene resin.

8. The method of making a thermosetting resin-fabric tube with an integral lining of polytetrafluoroethylene resin comprising the steps of placing on a mandrel a continuous layer of paste-extruded polytetrafluoroethylene resin free of volatile constituents, thereafter applying one or more wraps of fabric with the final wrap impregnated on its inner surface only and all previous wraps impregnated on both surfaces with polytetrafluoroethylene resin, applying heat and pressure to the wrapped layer raising the temperature thereof to above the fusion temperature but below the decomposition temperature of the resin to fuse together adjacent resin surfaces, cooling and releasing the pressure on said wrapped layer to provide a sub-assembly, thereafter placing upon said sub-assembly a plurality of wraps of fabric saturated on both surfaces with an uncured thermosetting resin to form a composite assembly, thereafter placing upon said composite assembly a wrapping of fused polytetrafluoroethylene tape followed by a wrapping of glass fabric tape, heating the wrapped composite assembly to above the curing temperature of said thermosetting resin until said resin is set, cooling said wrapped composite assembly, and thereafter removing the last two wrappings of tape from said composite assembly and said composite assembly from the mandrel, whereby a unitary tubular structure is formed having essentially the mechanical properties of the thermosetting resin-fabric combination and the chemically inert properties of the polytetrafluoroethylene resin.

9. The method of making a thermosetting resin-fabric tube with an integral lining of polytetrafluoroethylene resin comprising the steps of placing on a mandrel a continuous layer of paste-extruded polytetrafluoroethylene resin free of volatile constituents, thereafter applying one or more wraps of fabric with the final wrap impregnated on its inner surface only and all previous wraps impregnated on both surfaces with polytetrafluoroethylene resin, tightly placing thereon a wrapping of glass fabric tape, heating the wrapped layer to above the fusion temperature but below the decomposition temperature of the resin to fuse together adjacent resin surfaces, cooling the wrapped layer and removing the glass tape to provide a sub-assembly, thereafter placing upon said sub-assembly a plurality of wraps of fabric saturated on both surfaces with an uncured thermosetting resin to form a composite assembly, thereafter placing upon said composite assembly a wrapping of fused polytetrafluoroethylene tape followed by a wrapping of glass fabric tape, heating the wrapped composite assembly to above the curing temperaure of said thermosetting resin until said resin is set, cooling said wrapped composite assembly, and thereafter removing the last two wrappings of tape from said composite assembly and said composite assembly from the mandrel, whereby a unitary tubular structure is formed having essentially the mechanical properties of the thermosetting resin-fabric ombination and the chemically inert properties of the polytetrafluoroethylene resin.

10. The method according to claim 9, wherein said continuous layer of paste-extruded polytetrafluoroethylene resin comprises a first wrap of unfused tape, and wherein a second wrap of fused tape is disposed between said first wrap of unfused tape and the first wrap of fabric impregnated with said polytetrafluoroethylene resin.

11. The method of making a thermosetting resin-fabric tube with an integral lining of polytetrafluoroethylene resin comprising the steps of placing on a mandrel a continuous layer of unsintered paste-extruded polytetrafluoroethylene resin free of volatile constituents, thereafter applying one wrap of fabric impregnated on both sides followed by one wrap of fabric impregnated on its inner surface only with polyetetrafluoroethylene resin, applying heat and pressure to the wrapped layer raising the temperature thereof to above the fusion temperature but below the decomposition temperature of the resin to sinter said layer and fuse together adacent resin surfaces, cooling and releasing the pressure on said wrapped layer to provide a sub-assembly, thereafter placing upon said sub-assembly at least four wraps of fabric saturated on both surfaces with an uncured thermosetting resin to form a composite assembly, curing said thermosetting resin, and thereafter removing said composite assembly from the mandrel, whereby a unitary tubular structure is formed having essentially the mechanical properties of the thermosetting resin-fabric combination and the chemically inert properties of the polytetrafluoroethylene resin.

12. The method of making a thermosetting resin-fabric tube with an integral lining of polytetrafluoroethylene resin comprising the steps of placing on a mandrel a continuous layer of polytetrafluoroethylene resin free of volatile constituents and prepared from extruded resin, thereafter applying one or more wraps of fabric with the final wrap impregnated on its inner surface only and all previous wraps impregnated on both surfaces with polytetrafluoroethylene resin, applying heat and pressure to the wrapped layer raising the temperature thereof to above the fusion tempreature but below the decomposition temperature of the resin to fuse together adjacent resin surfaces, cooling and releasing the pressure on said wrapped layer to provide a sub-assembly, thereafter placing upon said sub-assembly a plurality of wraps of fabric saturated on both surfaces with an uncured thermosetting resin to form a composite assembly, curing said thermosetting resin and thereafter removing said composite assembly from the mandrel, whereby a unitary tubular structure is formed having essentially the mechanical properties of the thermosetting resin-fabric combination and the chemically inert properties of the polytetrafluoroethylene resin.

References Cited in the file of this patent

UNITED STATES PATENTS

| | | |
|---|---|---|
| 2,123,155 | Groff | July 5, 1938 |
| 2,552,599 | Stout | May 15, 1951 |
| 2,653,887 | Slayter | Sept. 29, 1953 |
| 2,755,821 | Stahl | July 24, 1956 |
| 2,783,173 | Walder et al. | Feb. 26, 1957 |